United States Patent [19]
Matsuoka et al.
[11] 4,405,923
[45] Sep. 20, 1983

[54] GARAGE DOOR CONTROL SYSTEM

[75] Inventors: Shigeru Matsuoka; Takeshi Tokunaga; Seiji Yonekura; Kogi Yamauchi; Mitsuo Suzuki, all of Hitachi, Japan

[73] Assignee: Hitachi, Ltd., Tokyo, Japan

[21] Appl. No.: 227,678

[22] Filed: Jan. 23, 1981

[30] Foreign Application Priority Data

Jan. 31, 1980 [JP] Japan ................................ 55-11343

[51] Int. Cl.³ ........................ H04Q 9/00; H02P 1/04; E05F 11/60

[52] U.S. Cl. ............................... 340/825.56; 340/696; 318/266

[58] Field of Search ...................... 340/825.56, 825.76, 340/696; 318/266, 468

[56] References Cited

U.S. PATENT DOCUMENTS

| | | | |
|---|---|---|---|
| 3,371,316 | 2/1968 | Johnson | 340/696 |
| 3,625,328 | 12/1971 | Carli . | |
| 3,978,376 | 8/1976 | Wilson . | |
| 4,328,540 | 5/1982 | Matsuoka et al. | 318/266 |
| 4,338,553 | 7/1982 | Scott, Jr. | 318/266 |

*Primary Examiner*—Donald J. Yusko
*Attorney, Agent, or Firm*—Antonelli, Terry & Wands

[57] ABSTRACT

A garage door operation control system comprises a door operating apparatus for operating a garage door, a plurality of push buttons for issuing a plurality of operating commands associated with the door operation by predetermined button operations, means for setting an operating command by the operation of the push buttons, and means for controlling the operation of the door operating apparatus on the basis of the operating command thus set.

16 Claims, 16 Drawing Figures

| DATA | $D_1$ | $D_2$ | $D_3$ | $D_4$ |
|---|---|---|---|---|
| COMBINATION 1 | 1 | 0 | 0 | 1 |
| COMBINATION 2 | 0 | 1 | 0 | 1 |
| COMBINATION 3 | 0 | 0 | 1 | 1 |

GARAGE DOOR CONTROL SYSTEM

The present invention relates to a garage door control system or more in particular to a garage door control system suitable for controlling a garage door with push button switches.

An example of the mechanical construction of a garage door driven and controlled by an electrical circuit is disclosed in U.S. Pat. No. 3,625,328. Also, an apparatus for issuing a command on opening/closing of a garage door with a push button switch is disclosed in U.S. Pat. No. 3,978,376.

Generally, objects of garage door control include:

1. Garage Door Operating Command

An operating command means includes a push button switch mounted on a wall or the like or a transmitter/receiver using an electric radio wave.

2. Illumination in Garage

A lamp is used for illuminating the inside of a garage to facilitate accomodation of a car in a garage after arrival thereat. Generally, the lamp is lighted in interlocked relation with the garage door and controlled to be extinguished after the lapse of a predetermined length of time automatically.

Various functions have been added to these objects of control to meet the strong demand for an efficient operation of the garage and an increased reliability and security thereof. A few examples are described below.

(1) A vacation switch for setting the garage door not to open in response to any other electrical radio waves to protect the security of the garage such as when the car is out of the garage.

(2) A constant light switch for keeping the lamp on as illuminating means to provide convenience for work in the garage.

These additional functions may be provided by merely adding an appropriate switch, although it leads to the inconveniences including an increased number of switches as mentioned below.

(1) The quantity of wires is increased, thus reducing the reliability.

(2) The mischief of children is induced.

Especially, the mischief by children poses a safety problem when the garage door switches are tampered with. Specifically, the garage door is inoperative if the vacation switch is on. In spite of the belief that the lamp will be turned off automatically, it is kept on by the activation of the constant light switch, thus increasing the power consumption. Further, if the push button is depressed carelessly when a child happens to be just under the garage door, the garage door may strike his head dangerously.

An object of the present invention is to provide a garage door control apparatus in which a push button device including a plurality of push buttons is operated to issue a plurality of garage door operating commands selectively, thus securing a proper and safe opening/closing operation of the garage door or operations related thereto.

According to an embodiment of the present invention, command setting means for controlling the garage door include a plurality of push buttons weighted respectively, and the operating sequence of the push buttons is differentiated for different objects of control.

The above and other objects, features and advantages will be made apparent by the detailed description taken in conjunction with the accompanying drawings, in which.

Figure 5A:
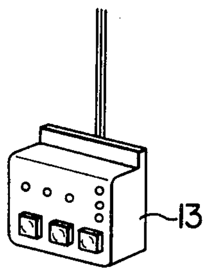
Figure 5B:
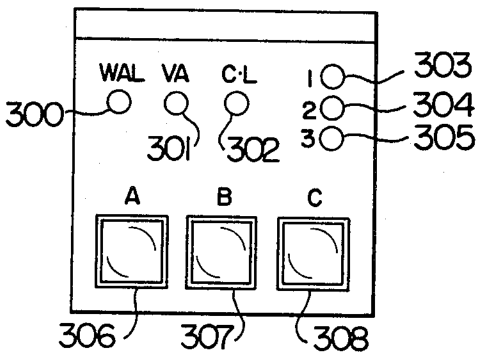
Figure 6:
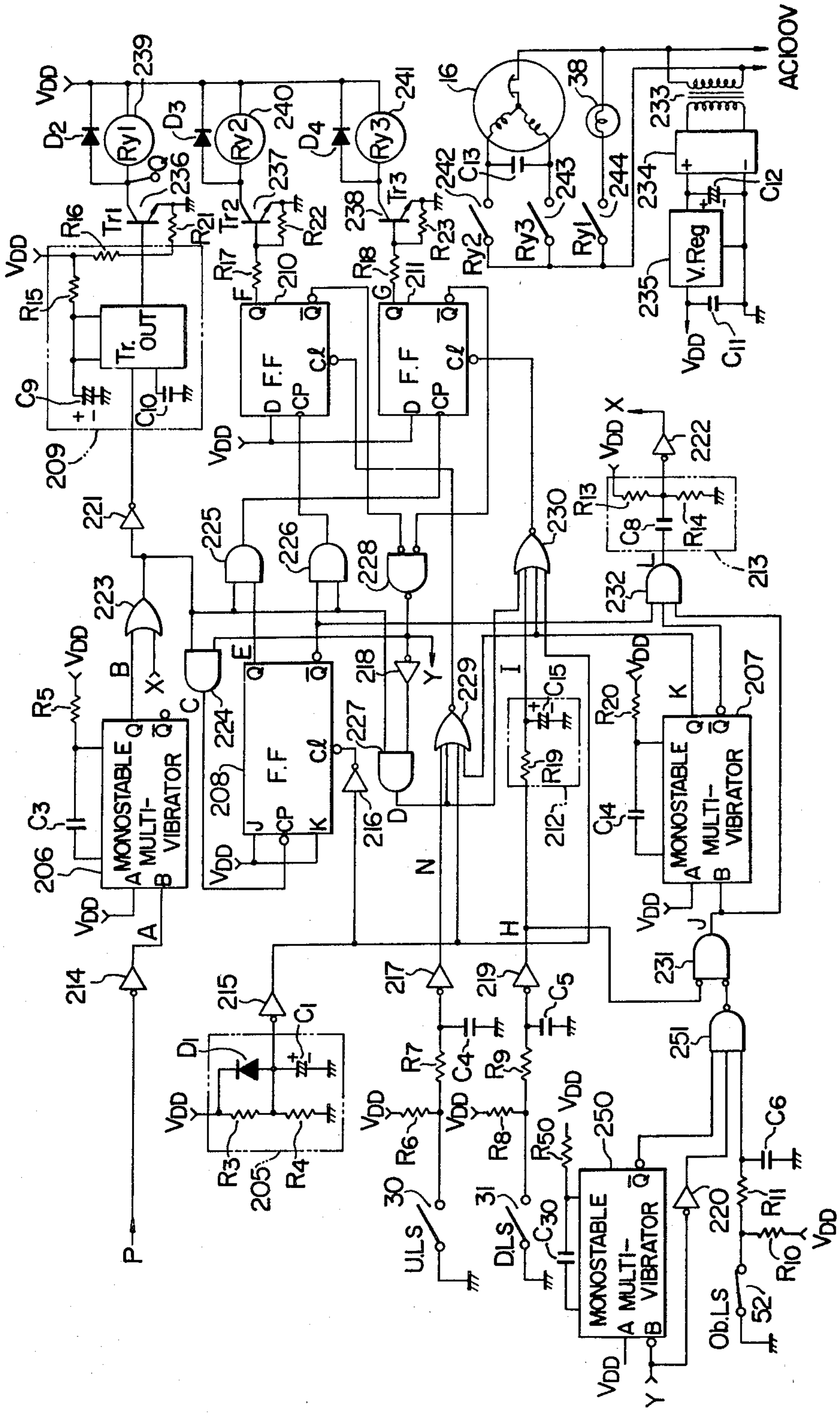
Figure 7:
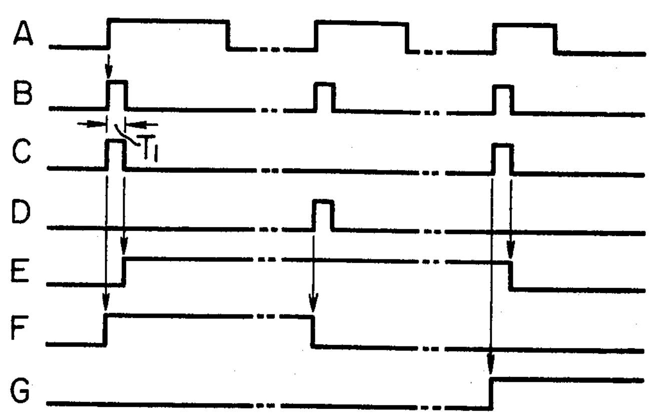
Figure 8:
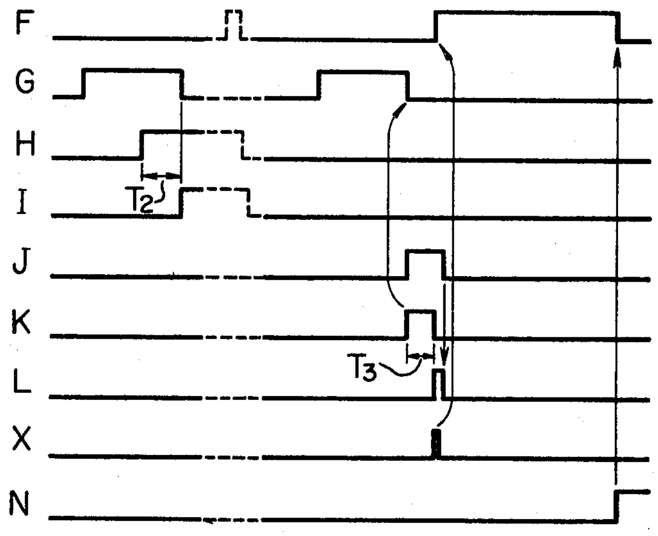
Figure 9:
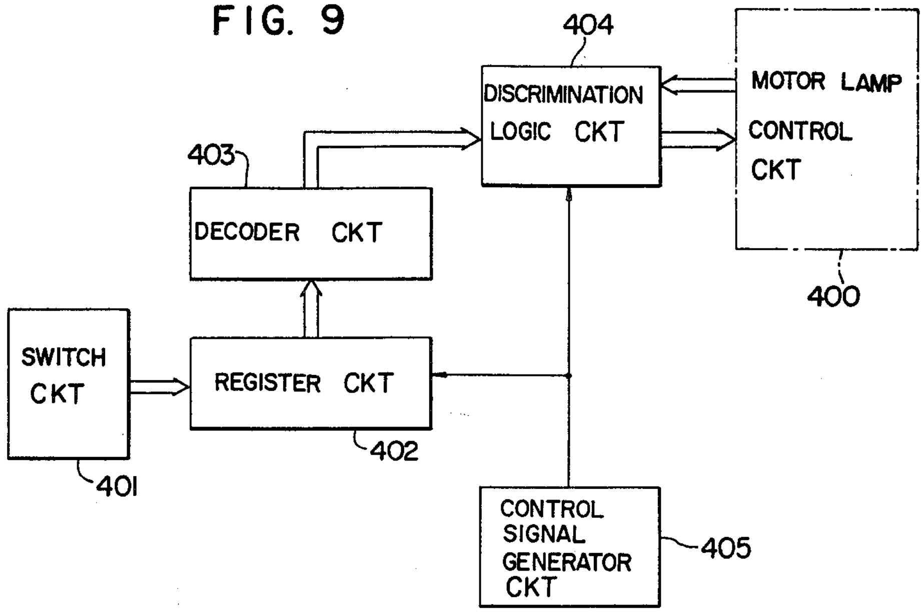
Figure 10:
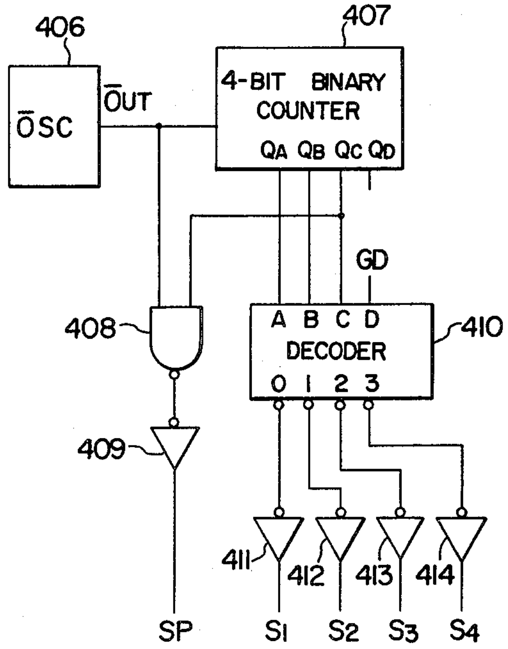
Figures 11, 12:
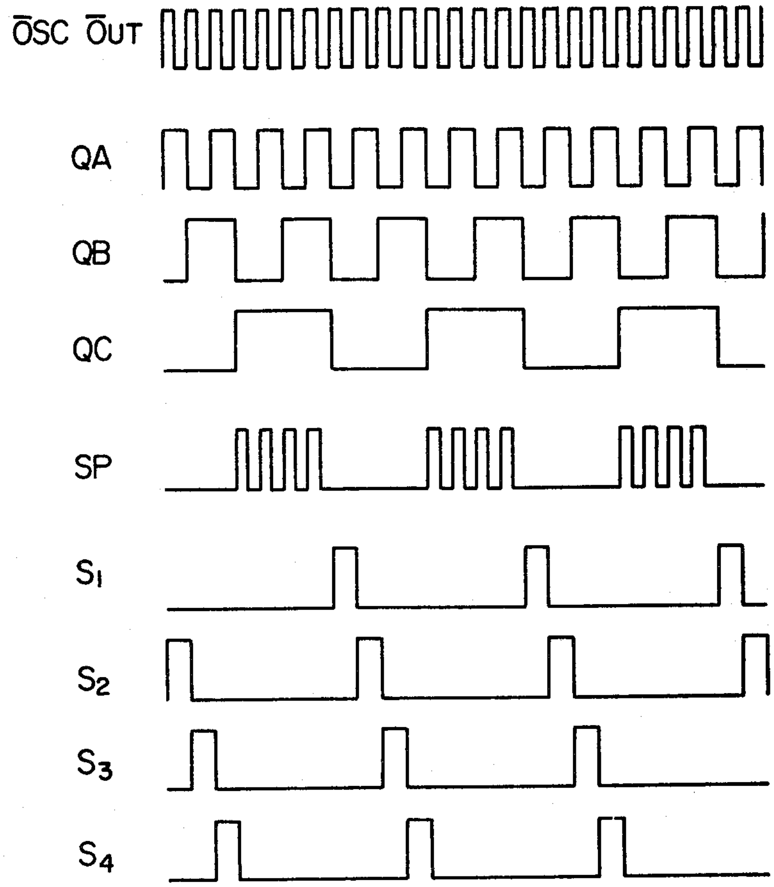
Figure 13:
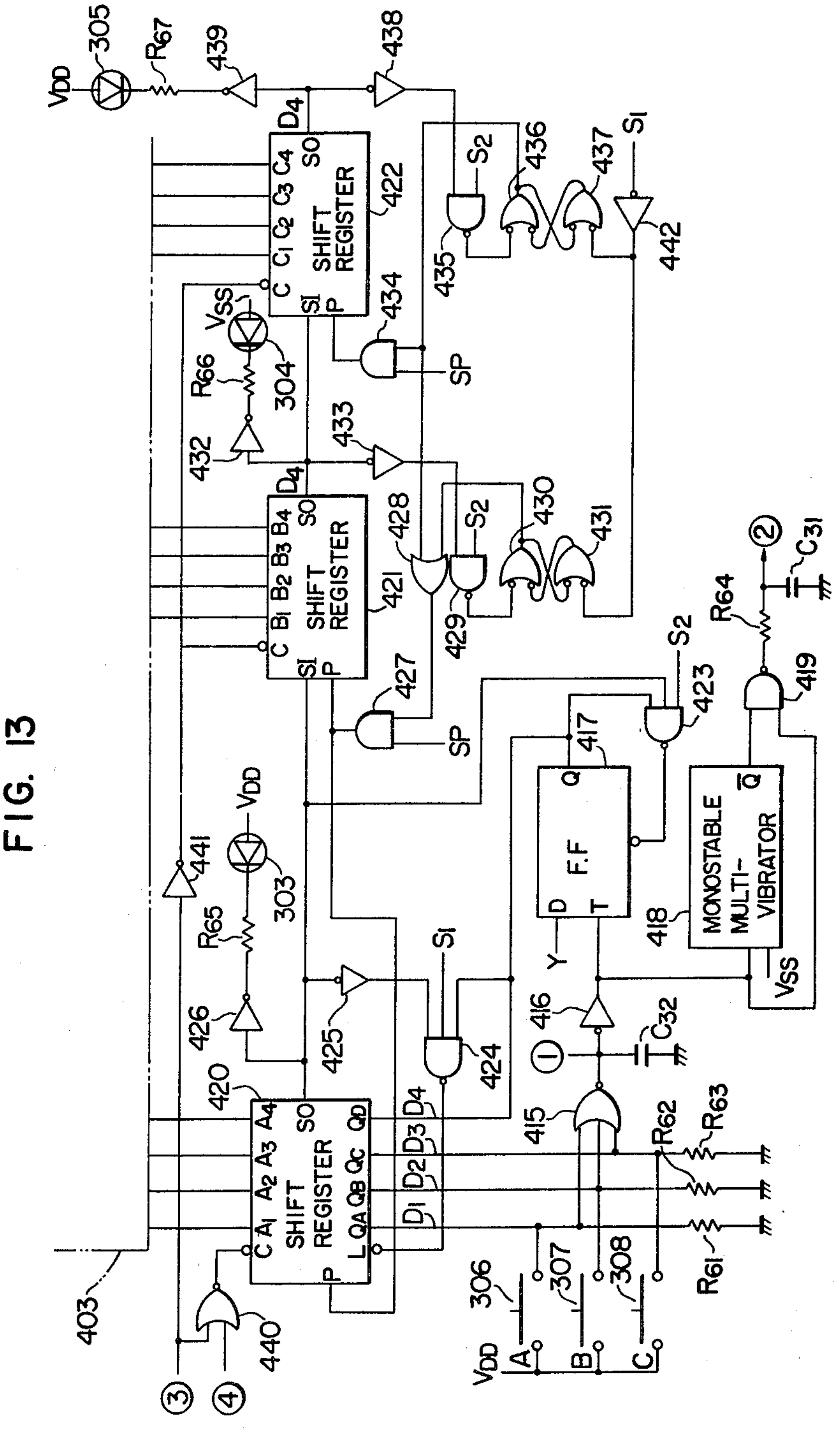
Figure 14:
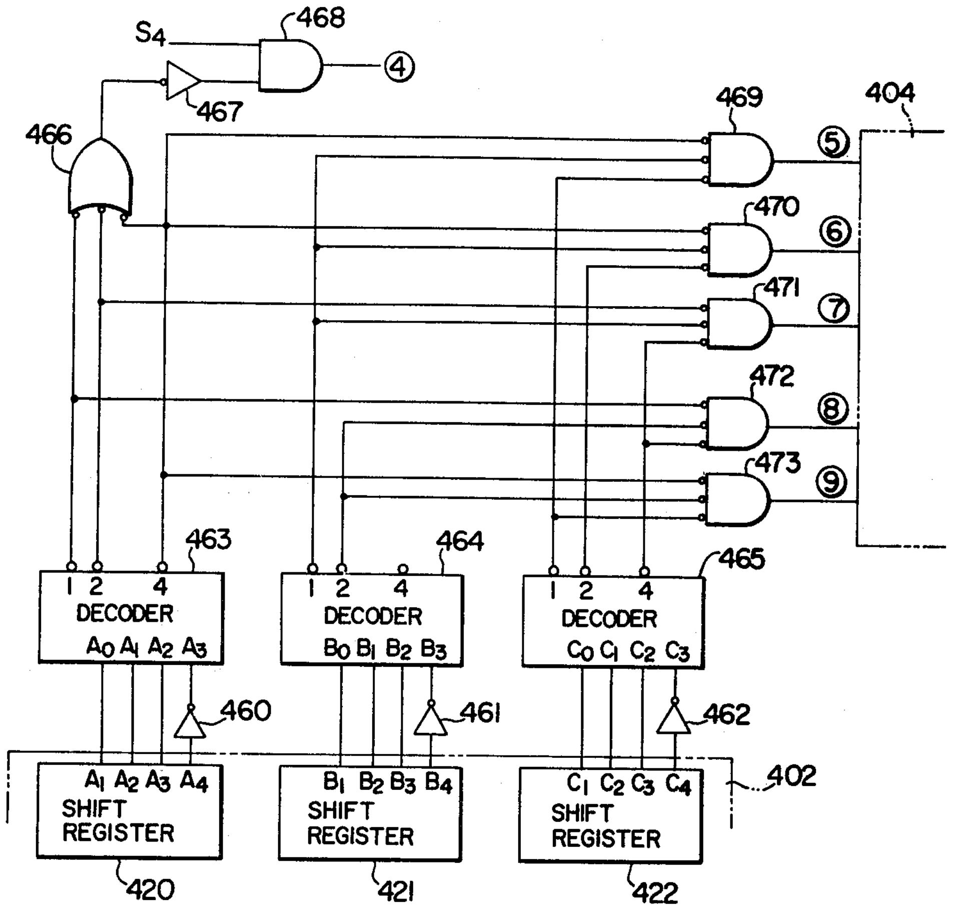

FIGS. 5*a* and 5*b* are outside views showing an embodiment of operating command setting means according to the present invention;

FIG. 6 is a circuit diagram for driving the garage door and performing the operations related thereto according to an embodiment of the present invention;

FIGS. 7 and 8 are timing charts for explaining the operation of the circuit shown in FIG. 6;

FIG. 9 is a block diagram showing a general construction of a garage door control apparatus according to the present invention;

FIG. 10 is a block diagram showing a configuration of a control signal generator circuit of FIG. 9 according to an embodiment of the present invention;

FIG. 11 shows waveforms of signals produced at the essential parts of the circuit shown in FIG. 10;

FIG. 12 is a diagram for explaining the signal processing by push button operation;

FIG. 13 is a block diagram showing the details of the switch circuit and the register circuit included in FIG. 9;

FIG. 14 is a block diagram showing the decoder of FIG. 9 in detail; and

Figure 15:
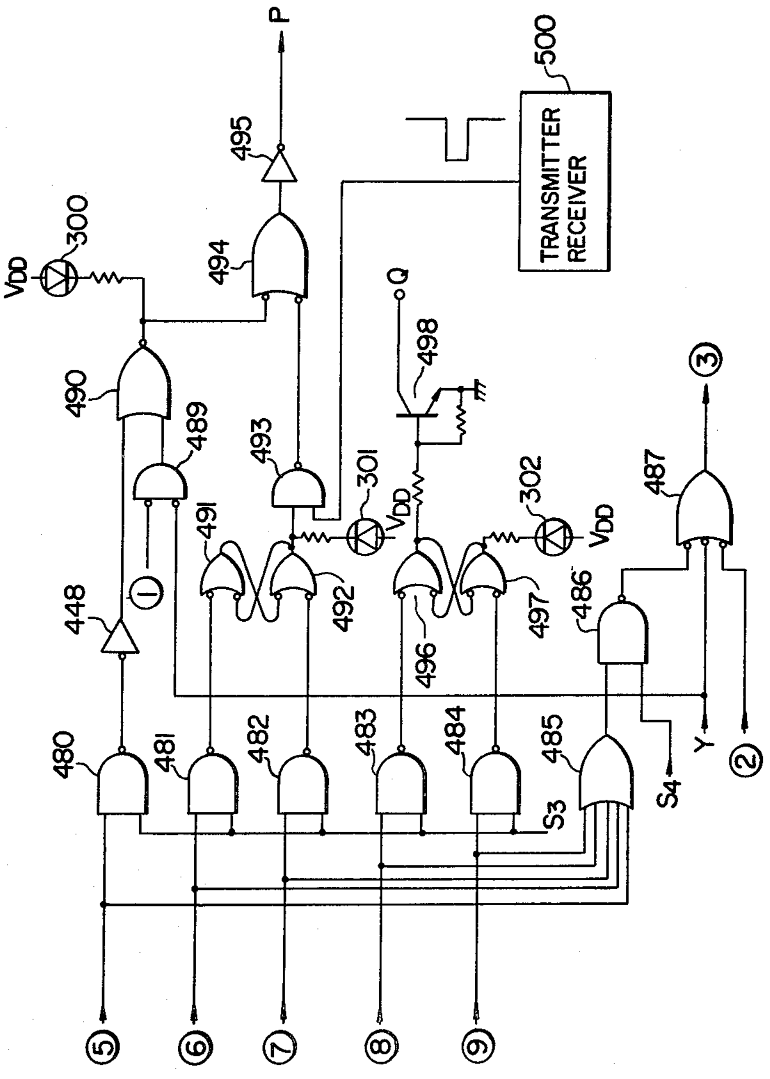

FIG. 15 is a block diagram showing a discrimination logic circuit of FIG. 9.

The whole construction of a garage door operating device according to the present invention is shown in FIGS. 1 to 4. The essential parts of the device comprise a body 1 housing a driving system, a rail 2 connected with the body 1, a roller chain 3 guided along the rail 2 by being driven by the driving power of the body 1, and a trolley 4 engaged with the roller chain 3 and adapted to be moved horizontally. The body 1 is hung from the ceiling of the garage by a hanger, and an end of the rail 2 is secured to part of the garage by a header bracket 5. A garage door 6, on the other hand, is generally divided into several parts coupled to each other and is opened and closed along door rail 7 on both sides thereof. The weight of the garage door 6 is balanced with a door balance spring 8 and is capable of being easily operated manually. A door bracket 9 is secured to the garage door 6. The door bracket 9 is rotatably coupled to the trolley 4 through a door arm 10. Thus the garage door 6 is closed or opened along the door rail 7 in an interlocked relation with the roller chain 3 actuated by the driving force of the body 1 and the trolley 4 horizontally moved along the rail 2 by actuation of the roller chain 3. Power is supplied to the body 1 through a power cable 11.

A command for operating the body 1 is issued to the body 1 by depressing a push button switch 12 mounted on the wall of the garage or from a control 13 housing a receiver for receiving a signal in the form of electric wave or the like. Should the garage door operating device be rendered inoperative by a power failure or a like accident, a releasing string 14 decouples the roller chain 3 and the trolley 4, thus making the garage door 6 ready for manual operation.

Figure 2:
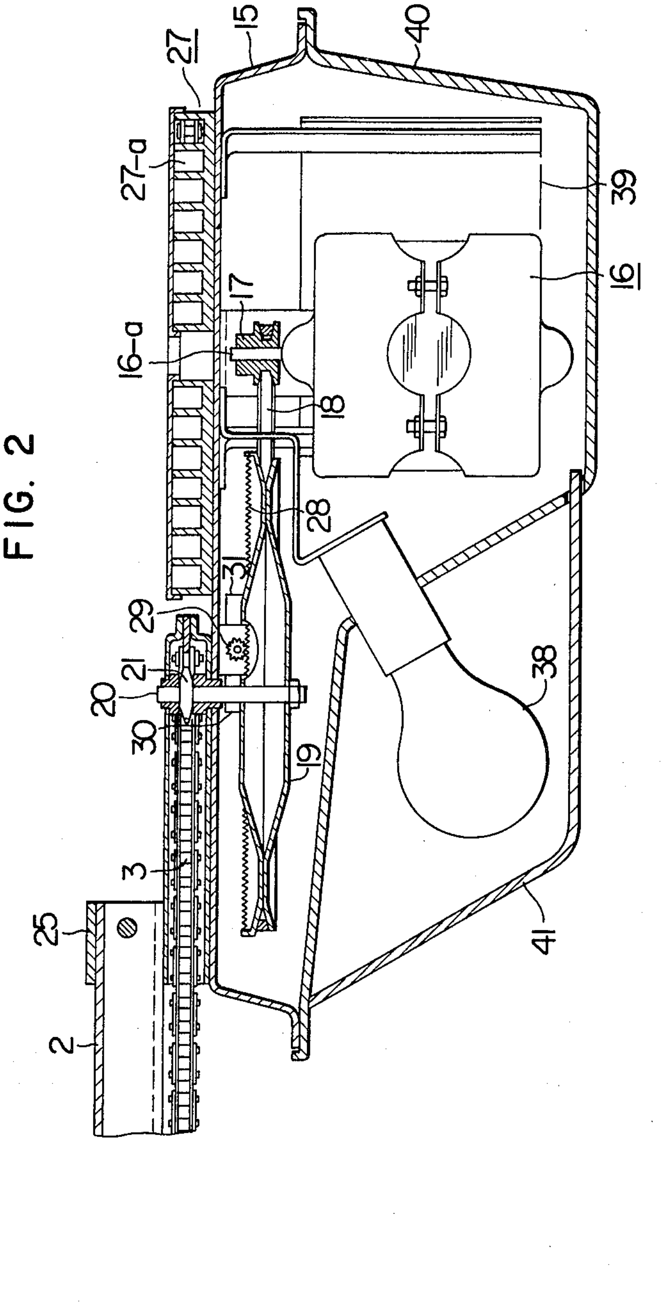
FIG. 2 is a longitudinal sectional view of a body housing a garage door driving system.
Figure 3:
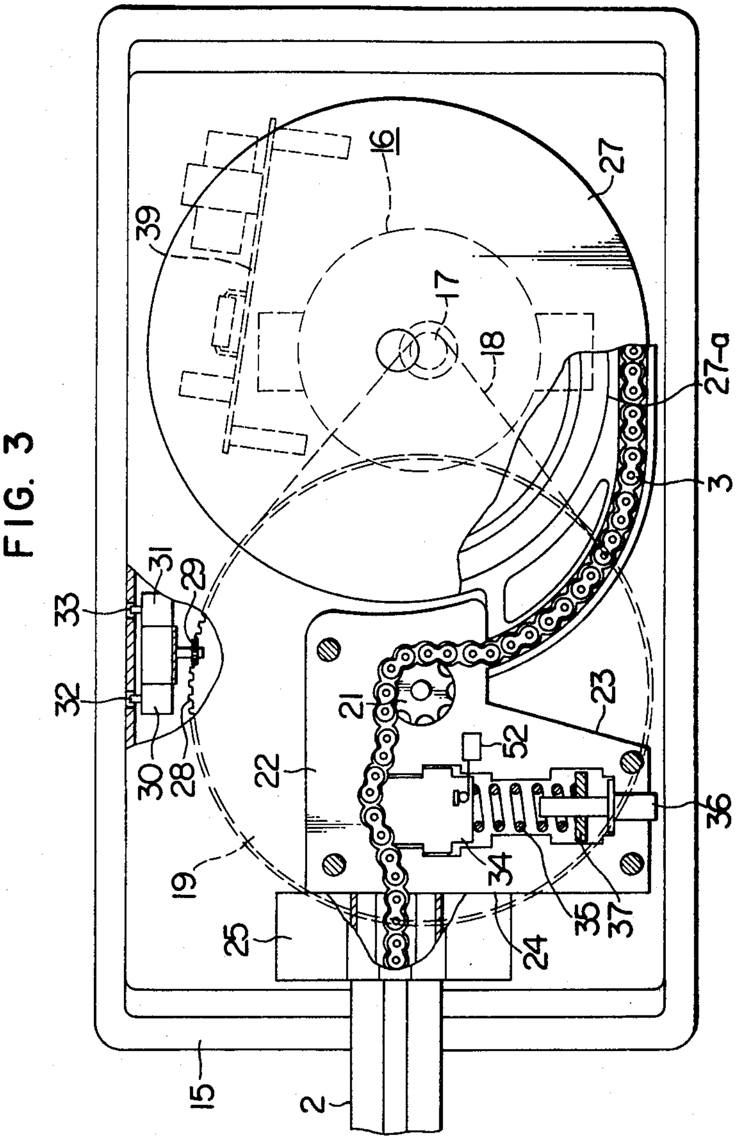
FIG. 3 is a partly cut-away plane view of a body housing the garage door driving system.

The construction of the body 1 of the garage door operating device will be explained with reference to FIGS. 2 and 3. FIG. 2 is a longitudinal sectional view and FIG. 3 a partially cut-away top plan view of the body 1. The turning effort of a motor 16 secured to the lower side of the body frame 15 is transmitted to a motor pulley 17 secured to a motor shaft 16-*a*, a V-belt 18 and a large pulley 19 sequentially. Further, the turning effort of the large pulley 19 is transmitted to a sprocket 21 through a sprocket shaft 20.

The sprocket 21 is engaged with the roller chain 3. The rollers of the roller chain 3 are guided by a chain guide (A) 22, a chain guide (B) 23 and a chain guide (C) 24 from both sides thereof above the body frame 15. The rail 2 is secured to the frame 15 by a rail securing metal 25 without any difference in level or a gap with a groove formed by the chain guide (A) 22 and the chain guide (C) 24. The rollers of the roller chain 3 are guided on both sides thereof by the rail 2.

The roller chain 3 taken up by the sprocket 21 is contained in a spiral chain containing groove 27-*a* of a chain containing case 27 secured without any difference in level or a gap with the groove formed by the chain guide (A) 22 and the chain guide (B) 23.

In this construction, the rotation of the motor 16 rotates the sprocket 21, so that the roller chain 3 is reciprocated along the rail 2.

Figure 1:
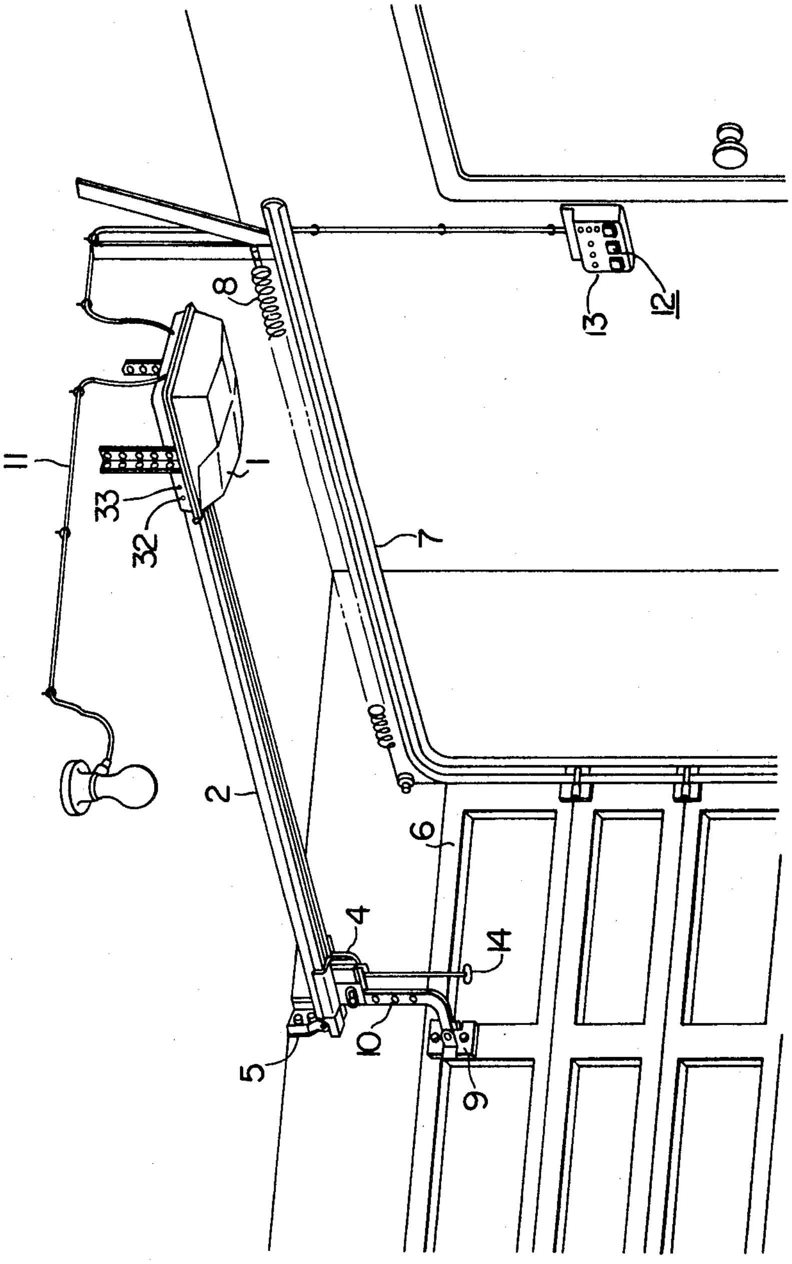
FIG. 1 is a perspective view showing a garage door operating device mounted in a garage.

Next, a door stop position control mechanism for limiting the horizontal movement of the trolley 4, i.e., the upper and lower limits of the operation of the garage door 6 explained with reference to FIG. 1 will be described. The amount of movement of the roller chain 3 is converted into the amount of movement of a pulley rack 28 provided on the outer periphery of the large pulley 19 rotated at the same rotational speed as the sprocket 21. The amount of movement of the pulley rack 28 is transmitted to an upper limit switch 30 and a lower limit switch 31 through a pinion 29 in mesh with the pulley rack 28.

The upper limit switch 30 and the lower limit switch 31 have an upper limit adjusting knob 32 and a lower limit adjusting knob 33 respectively whereby the upper limit point and the lower limit point are freely adjustable from outside of the body. The details of this switch mechanism are disclosed in U.S. Pat. No. 4,344,252, issued Aug. 18, 1982.

In the case where the garage door encounters an obstruction during the downward motion thereof, it should be immediately detected and the door operation should preferably be reversed, i.e., it must be moved upward for safety's sake. If the garage door strikes an obstruction during the upward motion thereof, on the other hand, it should be detected and the door should preferably stopped immediately for safety's sake. The above-mentioned obstruction detecting mechanism will be described below.

Part of the chain guide groove formed by the chain guide (A) 22, the chain guide (B) 23 and the chain guide (C) 24 is curved. An obstruction detecting device 34 is provided which is driven by the compressive force applied to the roller chain by the downward door motion or the tensile force applied to the roller chain 3 by the upward door motion. The compressive force of the obstruction detecting spring 35 for limiting the operation of the obstruction detecting device 34 is changed by moving the spring holding plate 37 by turning the obstruction-exerted force adjusting screw 36. Also, by the operation of the obstruction detecting switch 52 which is turned on and off in response to the movement of the obstruction detecting device 34, such an obstruction as mentioned above is detected, so that the door is reversed into upward motion from downward motion, whereas it is stopped if it is in upward motion.

A lamp 38 is for illuminating the inside of the garage, which lamp 38 is adapted to be turned on or off in response to the movement of the garage door. Further, a controller 39 for controlling the motor 16 and the lamp 38 is secured within the frame 15. A body cover 40 and a lamp cover 41 cover the motor 16, the large pulley 19 and the lamp 38. The lamp cover 41 is translucent and allows the light of the lamp 38 to pass therethrough, thus brightly illuminating the inside of the garage. The foregoing is the description of the construction of the body of the garage door operating device. Next, the rail and the trolley will be explained below with reference to FIG. 4.

Figure 4:
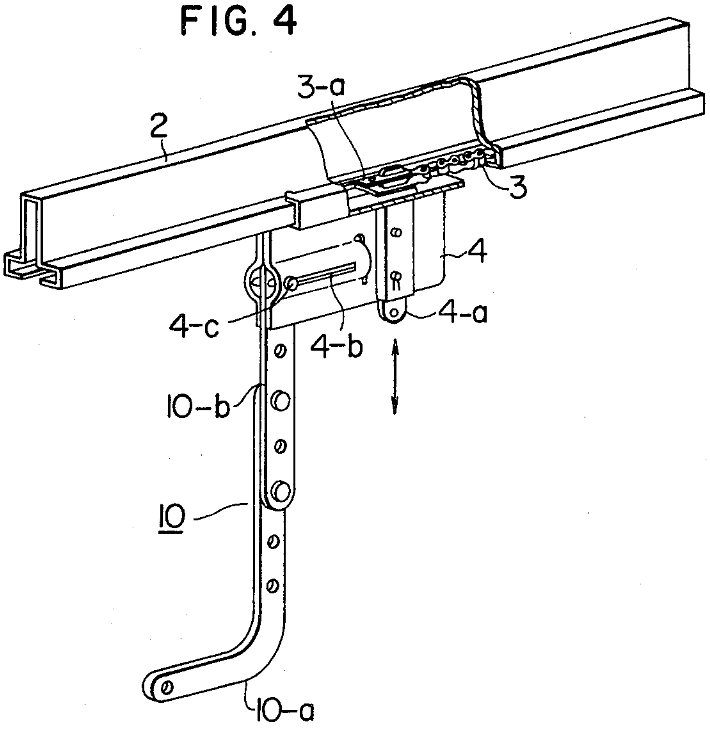
FIG. 4 is a partly cut-away perspective view showing the coupled relation of a rail and a trolley.

The rail 2 is formed of a thin iron plate or a plastic plate and is used to slidably guide the trolley 4 along the outer periphery thereof. The rail 2 holds the rollers of the roller chain 3 from both sides thereof thereby to reciprocate the roller chain 3 in a straight line. The trolley 4 and the roller chain 3 are coupled to each other in such a way that a connecting metal 4-*a* is inserted into an opening formed in the roller chain attachment 3-*a* secured to the end of the roller chain 3 and guided in the same manner as the roller chain 3. The connecting metal 4-*a* is slidable within the trolley 4 and is normally held up by the force of a spring or the like, thus coupling the trolley 4 with the roller chain 3. In the event of a power failure or other accident when the door is required to be operated by human power by separating the garage door operating device from the door, the connecting metal 4-*a* is pulled down and separated from the roller chain attachment 3-*a*. The door arm 10 for transmitting the operation of the trolley 4 is comprised of an L-shaped door arm portion 10-*a* and a straight door arm portion 10-*b* which are coupled with the length thereof determined freely depending on the positional relation between the door and the rail. An end of the door arm 10 is connected to the trolley 4, and the other end thereof is connected to the door 6 through the door bracket 9 shown in FIG. 1. The door arm 10 and the trolley 4 are connected with each other in such a manner that a pin 4-*c* is inserted into the slot 4-*b* of the trolley 4. The pin 4-*c* is normally kept pressed by spring or the like against an end of the slot 4-*b* as shown in FIG. 4. This is for the purpose of absorbing the shock which will occur if the door collides with an obstruction while moving down.

Further, some action must be taken to prevent the reversing of the door downward movement by erroneous obstruction detection in the presence of a small item such as a water hose or the raising of the floor surface by snow, ice or the like. Specifically, up to the height of two inches from the floor surface, it is necessary that the door movement be not reversed but stopped by detection of an obstruction. In this case, the difference of the amount of movement between the trolley 4 and the door 6 is absorbed by the slot 4-*b*.

FIGS. 5*a* and 5*b* are outside views of a device for setting an operating command for the garage door including push buttons. This setting device shows the same element as the one designated by reference numeral 13 in FIG. 1. As shown, three push buttons A, B and C are provided. The operating sequence of push buttons and a related operating command in this embodiment are shown below.

| Operating sequence | | Operating command |
|---|---|---|
| 1. | A → A → C | Door operating command (Command for starting the door from stationary condition) |
| 2. | B → A → C | Vacation switch ON (Door uncontrollable by radio wave) |
| 3. | C → A → B | Vacation switch OFF (Normal door control by radio wave restored) |
| 4. | C → B → A | Constant light switch ON (Lamp kept on (continuously lit)) |
| 5. | A → B → C | Constant light switch OFF (Lamp extinguished) |
| 6. | A, B, C | Door stops if any switch is depressed during door operation |
| 7. | A, B, C | When the same switch is kept depressed for longer than 3 seconds in any of the operating sequences 1 to 5 above, the immediately preceding setting is cleared. |

In FIG. 5, numerals 300, 301 and 302 respectively show indicators for indicating a door operating command (lit only for a predetermined length of time), a vacation switch ON and a constant light switch ON.

Numerals 303, 304 and 305 show other indicators for indicating whether or not information is stored in registers.

Prior to explaining a circuit embodying the above-mentioned functions, the main functions of the garage door operating device, i.e., garage door opener will be described with reference to FIGS. 6, 7 and 8.

In FIG. 6, reference character P shows a door operating command signal (an operating input from a transmitter/receiver by a push button switch or radio wave), numeral 30 a door upper limit switch, numeral 31 a door lower limit switch, numeral 52 an obstruction detecting switch, numeral 205 a power supply reset circuit for producing a reset signal at the rise of the power supply, numerals 206, 207 and 250 monostable multivibrators, numeral 208 a J-K master slave flip-flop, numeral 209 a timer circuit using NE555 (of Signetics Corporation), numerals 210 and 211 D-type flip-flops, numeral 212 an integrator circuit, numerals 213 a differentiator circuit, numerals 214 to 222 NOT elements, numeral 223 a 2-input OR element, numerals 224 to 228 2-input AND elements, numerals 229 and 230 4-input NOR elements, numeral 231 a 2-input NAND element, numeral 232 a 3-input AND element, numeral 251 a 3-input NAND element, numeral 233 a transformer for control power source, numeral 234 a diode stack, numeral 235 a voltage regulator for the control power supply, numerals 236 to 238 relay-driving transistors, numerals 239 to 241 relay coils, numerals 242 to 244 contacts of the relays, actuated by the relay coils 239 to 241 respectively, numeral 245 a door operating driving motor, and numeral 38 a lamp.

The operation of this circuit will be explained below with reference to the time charts of FIGS. 7 and 8. When power is thrown in this circuit, a control source voltage VDD is supplied from the transformer 233 through the diode stack 234 and the voltage regulator 235. The signal VDD is integrated by the power supply reset circuit 205 thereby to delay the rise thereof, so that a reset pulse is produced through the NOT element 215 which pulse is raised to high level during the delay time immediately following the power throw in. The reset pulse resets the J-K master slave flip-flop 208 through the NOT element 216, and further resets the D-type flip-flops 210 and 211 through the 4-input NOR elements 229 and 230.

Assuming that the NOT element 214 produces a signal A in response to a door operation command P, the monostable multivibrator 206 produces a signal B of pulse width T1 at the rise point of the signal A. This signal B is applied to the 2-input OR element 223 and the 2-input AND element 224 thus producing a signal C. The other input of AND element 224 is at high level when the garage door is stationary. The signal C is applied as a clock pulse signal to the J-K master slave flip-flop 208. During the high state of the signal C before reversal of the output signal E, the output of the 2-input AND element 226 is applied as a clock input signal to the flip-flop 210, so that the flip-flop 210 is set, thereby producing a signal F. With this signal as a door up drive command, the transistor 237 excites the relay coil 240 for door upward movement. Thus the relay contact 242 is turned on, thus driving the motor 16 in forward direction.

In this way, the motor 16 is started. At the same time, the signal B is applied as a trigger signal to the timer circuit 209 through the NOT element 221. This operation is intended to keep the lamp 38 ON for a predetermined length of time after the issue of the door operation command for illuminating the inside of the garage simultaneously with the start of the motor 16. For this purpose, the output of the timer circuit 209 excites the relay coil 239 through the transistor 236, and turns on the relay contact 244. As a result, the lamp 38 is lit for a predetermined length of time.

Next, if the upper limit switch 30 is turned on during the production of an up command output, the flip-flop 210 is reset through the NOT element 217 and the 4-input NOR element 229, so that the transistors 237 is turned off, the relay coil 240 is de-energized, the relay contact 242 is turned off, and the motor 16 stops.

In the case where an operation command P is issued again, during the production of the up command, on the other hand, the pulse signal B is produced from the monostable multivibrator 206 as mentioned above, so that an output is produced from the OR element 223. In view of the fact that the flip-flop 210 is set, however, the output of the 2-input AND element 228 is "low", thus prohibiting the output of the 2-input AND element 224. The output of the NOT element 218 is "high", and therefore, the pulse signal B is produced in the form of signal D from the 2-input AND element 227. This signal D is applied through the 4-input NOR element 229 to the flip-flop 210 as a reset signal. In this way, the motor 16 is stopped in this case, too. Upon receipt of another operating command, the output of the 2-output AND element 226 is prohibited in view of the fact that J-K master slave flip-flop 208 is set, so that the signal B is produced from the 2-input AND element 225 and the flip-flop 211 is set, thus producing the signal G. As a result, the transistor 238 is turned on, the door down drive relay coil 241 is excited, the relay contact 242 is turned on, the motor 16 is driven in the reverse direction, and thus the door is moved down.

If the lower limit switch 31 is turned on during the downward movement, a signal H is produced from the NOT element 219 and, after being delayed by time T2 at the integrator circuit 212, applied as a reset signal to the flip-flop 211 via the 4-input NOR element 230. In this way, the motor 16 is stopped as in the case of the upper limit switch being turned on during upward movement.

Next, the operation of the circuit with the obstruction detecting switch 52 turned on will be explained. Assume that the obstruction detecting switch 52 is turned on when the door is moving up, i.e., when the J-K master slave flip-flop 208 is set, the flip-flop 210 is set and the flip-flop 211 is reset. In view of the fact that the obstruction detecting switch 52 is closed at contact B, it is turned off. Thus, a "high" signal is produced from the 2-input NAND element 231 from the output of 3-input NAND element 251 and triggers the monostable multivibrator 207. The other 2 inputs of NAND element 251 are both at high level normally during garage door operation. The Q output pulse of the monostable multivibrator 207 resets the flip-flop 210 through the 4-input NOR element 229. At this time, the J-K master slave flip-flop 208 is set and therefore the output of the 4-input AND element 232 is prohibited.

Next, assume that the obstruction detecting switch 52 is turned on during the downward movement, i.e., when the J-K master slave flip-flop 208 is reset, the flip-flop 210 is reset and the flip-flop 211 is set. A signal J is produced from the 2-input NAND element 231 via the 3-input NAND element 251, and a signal K with pulse width T3 is produced from the monostable multivibrator 207. This signal K resets the flip-flop 211 through the 4-input NOR element 230. As a result, the motor is stopped and the door stops moving down. Further, at the fall point of the pulse signal K, the output $\overline{Q}$ of the monostable multivibrator 207 rises so that the output of the 3-input AND element 232 becomes "high" and a signal L is produced. This signal L is converted into a signal X through the differentiator circuit 213 and the NOT element 222 and applied to the 2-input OR element 223. In this way, a signal F which is an up command is produced from the above-mentioned control process, with the result that the door moves up until the turning on of the upper limit switch 30 and stops in response to an output signal N of the NOT element 217.

As will be seen from above, when the door detects an obstruction, the movement thereof is immediately stopped if moving up, and it is immediately stopped and begins to move up after the time period of T3 if moving down, thus securing the operating safety. In order to prevent the obstruction detection means from being unduly actuated by a small obstacle such as a stone or a rod located near the door lower limit or the rise of the floor level due to snow in winter, the turning on of the lower limit switch 31 causes the 2-input NAND element 231 to immediately prohibit the subsequent operation of obstruction detection, and the signal G making up a down command is reset by a signal I with time delay T2 produced from the integrator circuit 212. At time of this resetting, the door stops. During the door stoppage, the input of the obstruction detecting switch 52 is prohibited by the NAND element 231. In the case where a small obstacle is located near the door lower limit, the switch 52 is off. Also in the case where the door stops with the obstruction detecting switch being actuated while the door is moving up, the switch 52 is generally off. If a door operating command is applied under this condition, the door begins to move up or down. Since the signal Y falls down, the NAND element 251 produces a low-level output in the absence of the monostable multivibrator 250. Upon the production of this output or the restoration of the switch 31 to off state, the monostable multivibrator 207 is triggered and generates a signal, thus inconveniently stopping the door which is about to start. In order to assure smooth door starting, at the fall point of the output of the 2-input AND element 228, namely, at the time of start of the door, the monostable multivibrator 250 is triggered thereby to produce a low-level output for a predetermined period of time. This output is applied to an input of the 3-input NAND element 251 thereby to prevent the NAND element 251 from producing a low-level output for a predetermined length of time, thus ignoring an obstruction. The negligence of the obstruction detecting switch during door stoppage is of course attained by applying the output Y of the 2-input AND element 228 to the 3-input NAND element 251 similarly through the NOT element 220.

Now, the parts featured by the present invention will be described with reference to FIGS. 9 to 15.

FIG. 9 shows a basic block diagram of the present invention. The block 400 shows a motor and lamp control circuit corresponding to the circuit of FIG. 6 specifically. The block 401 shows a switch circuit including three push buttons A, B and C. By depressing these push buttons, information associated with the operation of a particular push button is applied to a register circuit making up a block 402. The register circuit is comprised of a first-in first-out shift register system including three registers. A first-in first-out register is one in which data are stored in the descending order of age, namely, order data are stored earlier. The data applied to the register circuit are discriminated by a decoder circuit of the block 403. Further, a command is discriminated at a discrimination logic circuit shown by the block 404 thereby to control the motor and lamp control circuit 400. The block 405 shows a control signal generator circuit for controlling the operation of the whole system.

The configuration of each block will be described in detail below.

FIG. 10 shows the detail of the control signal generator circuit 405 of FIG. 9. The oscillator circuit 406 is comprised of such a device as 555 of Signetics Corporation as generally used and oscillates at about 20 Hz. One of the outputs OUT of this circuit is applied to a 4-bit binary counter 407 cleared each time eight pulses are counted. The other output thereof is applied to a 2-input NAND element 408. The output of the binary counter 407 is applied to a decoder 410. This decoder 410 applies a low-level signal to corresponding one of the 4 output terminals when the count of the counter 407 is at 0, 1, 2 or 3 respectively, which output is applied through the NOT elements 411, 412, 413 and 414 thereby to generate control signals S1, S2, S3 and S4 respectively. These control signals are produced only when the QC output of the counter 407 is low while they fail to be produced when the count of the counter 407 is 4, 5, 6 or 7. The QC output is also applied to the 2-input NAND element 408, and the output of the oscillator circuit 406 is effectively produced only when the QC output is at high level. The output of the 2-input NAND element 408 is transformed into a shift pulse SP through the NOT element 409. This shift pulse is for transferring the data from the shift register to another shift register as described later in detail.

The relation between the above-mentioned control signals S1, S2, S3 and S4 and the shift pulse SP is shown in FIG. 11.

The blocks 401 and 402 shown in FIG. 9 will be explained below with reference to FIGS. 12 and 13.

FIG. 12 shows a storage format of the shift register.

D1: Corresponding to push button A representing $2^0$

D2: Corresponding to push button B representing $2^1$

D3: Corresponding to push button C representing $2^2$

D4: Indication as to whether data D1, D2 or D3 is present

"1" when data is present

"0" when data is not present

It is assumed that there are only three combinations of these data and other combinations are not effective.

A circuit based on this format is shown in FIG. 13. When the contacts 306, 307 and 308 for the switches A, B and C are depressed, the outputs are applied to a three-input NOR element 415 and a shift register 420. The output of the NOR element 415 is applied to a flip-flop 417 through a NOT element 416. The output at the Q terminal of the flip-flop 417 is the signal D4 indicative of the presence or absence of data, which signal is applied to the shift register 420. This flip-flop 417 is impressed with a Y signal at the D input thereof so as to be turned on only when the garage door is not operating. The Y signal is the output of the 2-input AND element 228 as shown in FIG. 6, which signal is at low level when the garage door is operating and at high level when the garage door is not operating. In other words, if the Y signal is at low level, the flip-flop 417 is not set even if a switch is depressed.

The shift register 420 is loaded with the data of one of the combinations shown in FIG. 12 only when it is not stored with any data. When any data is not stored in the shift register 420, the low-level output at the output terminal S0 of the data D4 is detected by the NOT element 425. Thus the 3-input NAND element 424 applies a control signal S1 to the load terminal L of the shift register 420, so that the data of the switch is loaded in the shift register 420. The three input signals of the 3-input NAND element 423 including the loaded signal D4, the Q output of the flip-flop 417 and the control signal S2 are all raised to high level in timing with the control signal S2, thus resetting the flip-flop 417. When data is stored in the shift register 420, any new data is applied as the NAND element 424 is prohibited by the low-level output of the NOT element 425.

The data thus loaded are transferred to the shift registers 421 and 422 sequentially in the manner described below.

Assume that the data are loaded on the shift register 420 by the control signal S1. If any data are stored in the shift register 421 or 422, the output D4 at the terminal S0 of the shift register 422 is at low level and is applied through the NOT element 438 to the 2-input NAND element 435. The other input terminal of the NAND element 435 is supplied with the control signal S2. By doing so, in synchronism with the rise of the control signal S2, the flip-flop made up of the 2-input NOR elements 436 and 437 is set. The output of this flip-flop is applied to the 2-input AND element 434 and the 2-input OR element 428. The output of the 2-input OR element is in turn applied to the 2-input AND element 427. The other input terminal of each of these 2-input AND elements 427 and 434 is supplied with a shift pulse SP, and therefore in response to the next shift pulse SP, the data in the shift register 420 are transferred to the shift register 421. The subsequent first control signal S1 resets the flip-flops 436 and 437. In view of the fact that data are still absent in the shift register 422, however, the next control signal S2 sets again the flip-flop made up of the 2-input NOR elements 436 and 437. The succeeding shift pulse SP transfers the data in the shift register 421 to the shift register 422. The presence of data is indicated by the light-emitting diode 305 being turned on through the NOT element 439. Similar processes are followed in the case of the shift register 421. When data are not stored in the shift register 421, the output D4 at the output terminal S0 is low level and is applied to the 2-input NAND element 429 through the NOT element 433. In response to the control signal S2, the flip-flop made up of the 2-input NOR elements 430 and 431 is set, so that the shift pulse SP is applied to the shift registers 420 and 421. This shifting operation is repeated until the shift registers 420, 421 and 422 are filled up with data. In the presence of the data, the light-emitting diodes 303, 304 and 305 are lighted through the NOT elements 426, 432 and 439 respectively.

By the way, the shift pulse SP, and the control signals S1, S2, S3 and S4 make up one stage of data transfer between the shift registers. The flip-flops made up of 2-input NOR elements 436 and 437, 430 and 431 are reset each stage by the control signal S1 through the NOT element 442.

In the drawing, signal ① shows that the switch A, B or C is depressed and is used for another circuit as described in detail with reference to FIG. 15.

The monostable multivibrator 418 triggered by this signal ① is set at the timer value of about 3 seconds. The two inputs including the $\overline{Q}$ output and the signal ① are applied to the 2-input NAND element 419. Thus the output of the 2-input NAND element 419 is reduced to low level 3 seconds after the push button switch is depressed. This output will be referred to as an all reset signal ② and will be described in detail with reference to FIG. 15.

The signal ③ applied to the clear terminal through the NOT element 441 is a master clear signal. Specifically, the shift register 420 is reset by the 2-input NOR element 440 for producing a reset signal in response to the minor rest signal ④ or master reset signal. The master reset signal ③ and the minor reset signal ④ will be described with reference to FIGS. 15 and 14 respectively.

The output of these shift registers is discriminated at the decoder circuit 403.

In FIG. 14, the outputs of the shaft registers 420, 421 and 422 ae applied, partly through the NOT elements 460, 461 and 462, and partly directly, to the decoder 463, 464 and 465 respectively. The data loaded in the shift register 420 is thus for the first time checked for significance. In other words, the combinations other than indicated in FIG. 12 are excluded. According to the present embodiment, operation of a plurality of push buttons is prohibited in this way. The output A4 of the shift register 420 represents the data D4 identical to the output S0. When the output A4 is high, the presence of data is indicated so that the decoder is actuated through the NOT element 460. The decoders are weighted for the data D1, D2 and D3 as shown below.

| | |
|---|---|
| D1 | $2^0 = 1$ |
| D2 | $2^1 = 2$ |
| D3 | $2^2 = 4$ |

Only when one of the 3 data is high in level, the decoder 463 produces a low-level output at one of the outputs 1, 2 and 4. When two or three of the 3 data are at high level, on the other hand, the output takes a value other than 1, 2 or 4 and therefore no output is produced. The output of the decoder 463 is checked at the 3-input NOR element 466 and produces high-level and low-level signals when the data are significant and insignificant respectively. The resulting signal is applied to the 2-input AND element 468 through the NOT element 467. If the data are not significant, an immediate resetting is necessary, and therefore when the input to the 2-input AND element 468 is high, the minor reset signal (4) is produced in synchronism with the control signal S4 thereby to reset the shift register 420 through the 2-input NOR element 440 shown in FIG. 13.

Further, the outputs of the decoders 463, 464 and 465 are applied to the 3-input NAND elements 469, 470, 471, 472 and 473 in order to discriminate the control elements by the sequential combination of push button operations. These NAND elements discriminate the operation commands, thus producing a set signal in accordance with the operation command involved. Each set signal has the following meaning:

| | | |
|---|---|---|
| (5) | A → A → C | Door operation command |
| (6) | B → A → C | Vacation switch ON |
| (7) | C → A → B | Vacation switch OFF |
| (8) | C → B → A | Constant light switch ON |
| (9) | A → B → C | Constant light switch OFF |

Explanation will be made now with reference to FIG. 15. The discriminated signal (5), (6), (7), (8) or (9) is applied to a 2-input NAND elements 480, 481, 482, 483, 484 or a 5-input OR element 485, respectively. One of the 2-input NAND elements produces an output signal in synchronism with the control signal S3 applied first after application of the set signal.

Now assume that the signal (5) is discriminated. A garage door operating command P is produced through the NOT element 448, the 2-input NOR element 490, the 2-input NOR element 494 and the NOT element 495. This signal P represents an input command P shown in FIG. 6. The output Y of the 2-input AND element 228 which is at low level in the case where the door is operating and the signal (1) (shown in FIG. 13) which is reduced to low level when one of the three push buttons is depressed are applied to the 2-input NAND element 489 thereby to produce a garage door stop command P through the 2-input NOR element 490, the 2-input NOR element 494 and the NOT element 495. In other words, during the operation of the door, the output Y of the AND element 228 is at low level and therefore the output of the NOT element 218 is at high level. Under this condition, the input signal P is applied through the 2-input AND element 227 and the NOR elements 229 and 230 thereby to reset the flip-flops 210 and 211, thus stopping the door operation.

Assume that the signal (6) is discriminated on the other hand. The flip-flop made up of the 2-input NOR elements 491 and 492 is set and therefore the input terminal of the 2-input NAND element 493 is reduced to low level. Under this condition, the gate is locked and no output is produced even when the other input terminal of the 2-input NAND element 493 is impressed with the signal from the transmitter/receiver 500. In other words, the control by radio wave as a vacation switch is impossible. In order to release this condition, the resetting operation of the signal (7) is required.

Assume that the signal (8) is discriminated. The flip-flop made up of the 2-input NOR elements 496 and 497 is set and therefore the transistor 498 is driven. The transistor 498 is connected in parallel with the transistor 236 to the Q terminal shown in FIG. 6 so that the relay Ry1 is turned on. Specifically, the lamp 38 is lighted. In order to cancel this condition, the resetting operation of the signal (9) is required.

Each of the above-mentioned operations is indicated by the light-emitting diode 300, 301 or 302.

The output of the 5-input OR element 485 and the control signal S4 are both applied to the 2-input NAND element 486, the output of which constitutes a master reset signal (3) for the shift registers. Specifically, the output of the 2-input NAND element 486 is reduced to low level when the operation command has been set; the signal Y is reduced to low level when the door operation is started; and the signal (2) is reduced to low level when the push button is kept depressed until the time limit as explained with reference to FIG. 13. When one of the 3 inputs of the NOR element 487 is reduced to low level, all the shift registers 420, 421 and 422 are reset. As to the initial setting at the time of power throw in, we add that all the shift registers are reset if a fourth input that may be added to the NOR element 487 is impressed with the output of the NOT element 215 of FIG. 6 through another NOT element.

The signal (2) mentioned with reference to FIG. 13 is such that the data stored in all the shift registers are conveniently reset by the push button being intentionally depressed for a long time in the case of a setting error or the like.

According to an embodiment of the present invention, the door may be opened or closed, the radio wave is rejected, or the lamp is kept lighted, by changing the combination of the push buttons to be depressed, thus very effectively preventing the mischief of children or improving the operating efficiency. Further, in the case where the garage door is operating, the door is stopped by depression by any push button, thus assuring operating safety.

The effect of this embodiment may be further improved by increasing the objects of control with an increased number of switch combinations for operation without much difficulty.

A few conceivable examples include a garage door up command, a garage door down command and a timer time setting.

If a microcomputer is used, the present invention is more easily realized and the features thereof will be made clearer.

It will thus be understood that according to the present invention the objects of control in the garage can be discriminated from each other according to appropriate combination of a plurality of push button switches, thus improving safety and reliability greatly.

What is claimed is:

1. A garage door control system comprising a door operating apparatus for operating a garage door, a plurality of push buttons for issuing a plurality of operating commands associated with the door operation by predetermined button operations, means for setting operating commands issued by said plurality of said push buttons, control means for controlling the operation of said door operating apparatus on the basis of an operating command set by said setting means, and a door stopping device for stopping the door operation by depressing a given one of said push buttons during door operation.

2. A garage door control system according to claim 1, wherein said door stopping device is such that when given one of said plurality of said push buttons is depressed under the condition where an operating command for selected one of door opening and closing is set in said setting means, the setting of said operating command is cancelled.

3. A garage door control system according to claim 1, wherein said door stopping device includes door operation recognizing means for detecting that said door is operated, push button pressure recognizing means for detecting that given one of said plurality of said push buttons is depressed, and means for cancelling the setting of the door operating command set in said setting device, upon simultaneous detection by said door operation recognizing means and said push button pressure recognizing means.

4. A garage door operation control system comprising a door operating apparatus for operating the door of a garage, a plurality of push buttons for issuing a plurality of operating commands associated with the door operation by a predetermined button operation, said operating command including a continuation command for continuation of a specific condition and a setting cancelling command for cancelling the setting of said continuation command, means for setting an operating command given by said plurality of said push buttons, and means for controlling the operation of said door operating apparatus in accordance with the operating command set by said setting means.

5. A garage door operation control system according to claim 4, further comprising an illumination lamp adapted to be lighted in response to the operating command for the garage door and extinguished after the lapse of a predetermined length of time, said continuation command being one for keeping said illumination lamp lighted.

6. A garage door operation control system according to claim 4, in which said door operating command is adapted to be given through a transmitter/receiver, said continuation command being one for preventing the operating command given through said transmitter/-receiver from being set in said setting means.

7. A garage door operation control system according to claim 4, 5 or 6, in which said setting means includes a switch circuit having a switch operated by the operation of said plurality of said push buttons, a register for temporarily storing a signal representing the operating condition of said switch of said switch circuit, a decoder for decoding the operating command in said register, and a logic circuit for setting an operating command decoded by said decoder.

8. A garage door operation control system comprising a door operating apparatus for operating a garage door, a plurality of push buttons for issuing a plurality of operating commands associated with the operation of said door by a predetermined push button operation, a switch circuit including a switch operated by the operation of said plurality of said push buttons, a register for temporarily storing an operating command representing an operating condition of said switch of said switch circuit, a decoder for decoding the operating command on the basis of the data in said register, a logic circuit for setting an operating command decoded by said decoder, and means for controlling the operation of said door operating apparatus on the basis of the operating command set in said logic circuit.

9. A garage door operation control system according to claim 8, further comprising a circuit for recognizing the operation of any of the switches of said switch circuit, said register storing the result of said recognition by said recognizing circuit as a recognition signal in binary form.

10. A garage door operation control system according to claim 9, in which said register is a shift register, said shift register being loaded with the operating signal from said switch circuit together with said recognition signal only in the presence of said recognition signal from said recognizing circuit.

11. A garage door operation control system according to claim 10, further comprising control means for shifting said operating signal in said shift register in such a manner that said operating signal is stored sequentially from the end of memory regions while at the same time confirming the presence of said recognition signal.

12. A garage door operation control system according to claim 10 or 11, further comprising a circuit for deciding whether each of the operating signals loaded in said shift register is based on a single button operation, and a circuit for resetting the loaded operating signal when said decision circuit decides that said loaded operating signal is not based on a signal button operation.

13. A garage door operation control system according to claim 8, further comprising a circuit for resetting the data in said register when said operating command is set in a logic circuit.

14. A garage door operation control system according to claim 8, further comprising means for indicating said set condition in accordance with the set condition of said logic circuit.

15. A garage door operation control system comprising a door operating apparatus for operating a garage door, a plurality of push buttons for issuing a plurality of operating commands associated with the door operation by a predetermined button operation, means for setting an operating command given by the operation of said plurality of said push buttons, means for controlling the operation of said door operating apparatus on the basis of the operating command set in said setting means, and means for cancelling an operating condition due to an erroneous push button operation by keeping a given push button on for longer than a predetermined length of time.

16. A garage door operation control system according to claim 15, further comprising means for detecting that any of said plurality of said push buttons is kept depressed, timing means adapted to be set at the press of any of said plurality of said push buttons and reset after the lapse of said predetermined length of time, a register for sequentially storing the operating conditions of said push buttons, and a circuit for resetting all the data in said register if said detecting means detects that any push button is kept depressed when said timing means is reset, said setting means decoding and setting said operating command on the basis of the data in said register.

* * * * *